3,142,528
GALVANOMETRIC RECORDING SYSTEMS
John A. Stafford and Robert L. St. John, Houston, Tex.,
assignors to Schlumberger Well Surveying Corporation,
Houston, Tex., a corporation of Texas
Filed Oct. 23, 1962, Ser. No. 232,530
6 Claims. (Cl. 346—109)

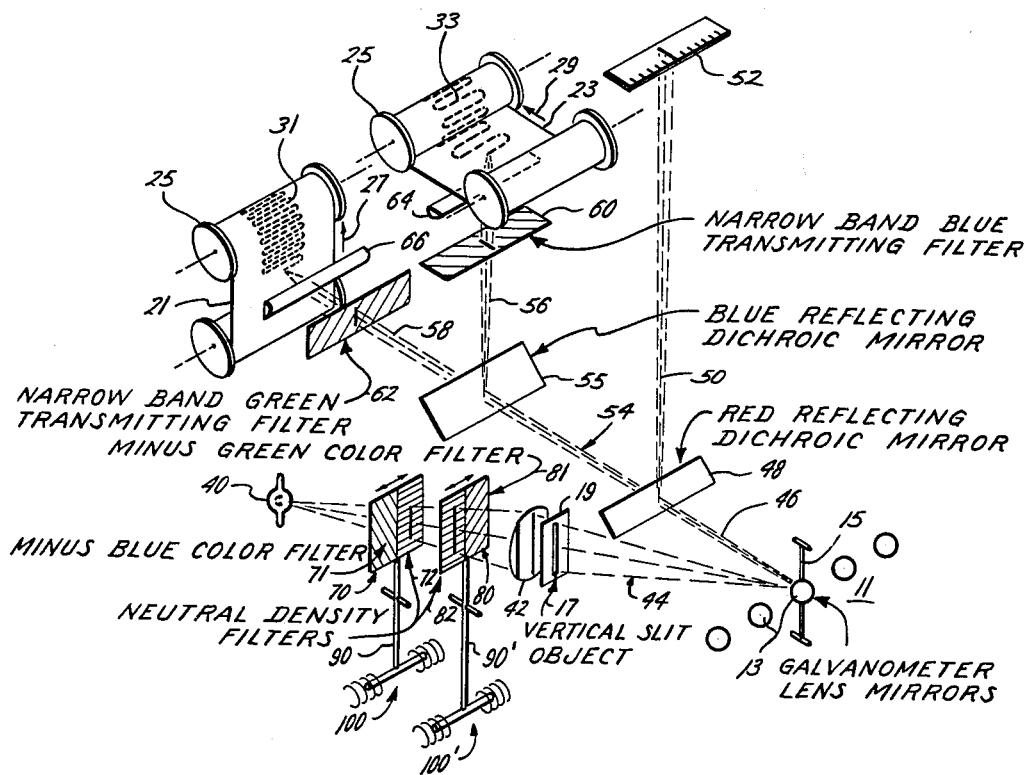

This invention relates to recorders and more particularly to galvanometric recorders in which intelligence information processed in a plurality of channels is recorded on two or more information storage media.

Each intelligence processing channel in a typical galvanometric recorder includes a D'Arsonval moving-coil galvanometer, or the like, for carrying a movable light-reflecting surface whose displacements correspond to the electric current flowing through the galvanometer's coil and hence to the monitored physical quantity, such as the earth's resistivity, the temperature and pressure of the liquid in a borehole, et cetera. It further includes an "object," a light source for impinging an object-light beam on the reflecting surface, and a film, or the like, exposed to the corresponding reflected image-light beam.

Frequently, it is advantageous simultaneously or selectively to record the position of the image beam on two or more films. Thus by assigning different velocities to the films, graphs of more or less compressed scales can be obtained. Obviously, a film moving at a higher speed "observes" the monitored quantity with greater precision than one running at a relatively slower speed. For example, recorders monitoring the conditions in a borehole are often equipped to provide a "regular" log on a slow-moving film and an "expanded" log on a film running at a relatively faster speed, the expanded log yielding more detailed information.

For convenience and economy, each film is made sufficiently wide to allow for the recording of several distinct image beams, each from a distinct galvanometer.

Because adjacent image beams may have paths of travel which coincide, it is convenient to "code" the beams. One method of coding may consist in periodically interrupting the several beams at discrete rates. While this coding method is suitable for recording light beams on a single film, it affords less satisfaction when the beams are recorded on two or more films running at different speeds. For reasons which will be readily apparent, the coding of the beams should be correlated with the speed of the films.

Accordingly, it is an object of the invention to provide new and improved optical recorders wherein a single light beam may be variously coded and then recorded on one or more information storage media.

It is another object of the invention to provide new and improved optical recorders wherein a light beam corresponding to a single object may be coded and recorded simultaneously on two or more films, or selectively on one or more films.

These and other objects of the invention are accomplished by providing a source of light for emanating a light beam comprising desirable color bands, intercepting the light beam with suitable color filters corresponding to the color bands, the rate of interception by each filter being determined by the desired coding, and then directing the segregated bands to separate films.

The appended drawing is intentionally diagrammatic for the sake of clarity and simplicity of exposition. Details of mechanical actuating devices, etc., were omitted from the drawing since they may be conventional. The single figure is a diagrammatic showing of a preferred recorder arrangement in accordance with the teachings of this invention.

A typical recorder, such as is used in conjunction with instruments for metering the conditions in a borehole, includes a plurality of D'Arsonval moving-coil galvanometers, generally designated as 11. The operation and the construction of such galvanometers are well understood. For the purpose of this exposition, it suffices to state that in each galvanometer a reflecting mirror 13 is mounted on a movable member, such as a torsion shaft 15, for rotation therewith in response to the intensity of a sensed condition.

Each galvanometer 11 cooperates with an illuminated object and with one or more light-sensitive media. A suitable object may be a narrow, vertical slit 17 in an opaque plate 19. The light-sensitive media may be films 21, 23 such as are used in photography. Each film is mounted for rotation on a suitable spool 25. Conventional motor-driven means (not shown) displace films 21, 23 in two planes, preferably perpendicular to each other, in directions as indicated by the arrows 27, 29.

It is desired to record, either simultaneously or selectively, on films 21, 23 the image of object 17 which is reflected from the galvanometer's mirror 13. If the displacement of each film is a known function of a given variable, such as time, depth, etc., then obviously the amplitude of the sensed condition causing the rotation of mirror 13 will be displaced in Cartesian coordinates as a function of said variable. Assuming that film 23 is being displaced at a faster rate than film 21, then curve 33 on film 23 will yield more detailed information than curve 31 on film 21.

The source of light for illuminating the slit object 17 may be of any suitable type. For the sake of efficiency, however, it is preferred to employ a mercury vapor lamp 40 because its luminescent output consists essentially of three principal color bands: red, blue, and green, the red band resulting from the incandescence of the lamp's electrodes. A collector lens 42, preferably positioned adjacent to and in rear of plate 19, provides a point image of slit object 17 on mirror 13 which is positioned at the focal length of the collector lens 42. Hereinafter, the incident beam of light on mirror 13 will be referred to as the "object beam" and the reflected beam of light from mirror 13, as the "image beam." The object beam is generally designated as 44, and the image beam as 46. It will be apparent that without filtering the reflected image beam 46 contains the same color bands as the object beam 44.

To channel the bands into directions for recording on films 21, 23, suitable dichroic mirrors are employed. It is often also desired to view directly the displacements of the image of object 17. For this purpose, a red-reflecting dichroic mirror 48 is positioned in the path of the image beam 46 for reflecting the red band 50 onto a suitable viewing scale 52. Beam-shaping lenses, not shown, may be employed to focus beam 50 on the viewing scale 52.

The beam 54 passing without deflection through dichroic mirror 48 contains the remaining blue and green color bands. It is assumed, of course, that mirror 48 is ideal. In practice, however, beam 54 will contain some red color also. Then after passing through a blue-reflecting dichroic mirror 55, beam 54 becomes split into a blue band 56 and a green band 58. Better results are achieved by interposing a narrow band, blue-transmitting filter 60 in the path of beam 56 and a green-transmitting filter 62 in the path of beam 58.

To achieve a near point image of slit object 17 on films 21, 23, a cylindrical lens 64 is placed in the path of beam 56 and a similar lens 66 in the path of beam 58. Then the desired traces 31, 33 will be recorded on the moving color films 21, 23, respectively.

To summarize the operation of the recorder thus far described, torsion shaft 15 of the galvanometer system 11 and hence image beam 46 become displaced as a function of the metered condition. The displacements of image beam 46 and hence of beam 50 can be then viewed directly on scale 52. The displacements can be also recorded on films 21, 23 as traces 31, 33, respectively.

As previously mentioned, it is desired that traces 31 and 33 be interrupted in accordance with distinct codes, for example, dash-dot and dot-dot, respectively. This may be conveniently accomplished by interrupting the object beam 44 with a number (depending on the number of principal color bands in beam 44) of suitable, distinct color filters, each having the property of selectively absorbing light rays whose frequencies correspond to the color band, the transmission of which it is desired to arrest.

In the path of object beam 44 are then periodically inserted two valves 70 and 80. Valve 70 comprises a minus blue color filter 71 and a neutral filter 72, as shown. Valve 80 includes a minus green color filter 81 and a neutral filter 82. Therefore, filters 71 and 81 are respectively opaque to the blue and green color bands in the spectrum of beam 44. Valves 70, 80 may be fixedly secured to movable arbors 90, 90' for becoming actuated by conventional electromagnetic oscillatory devices 100, 100', respectively.

When valves 70 and 80 assume such positions that the object beam 44 passes through the neutral filter 72 and through the minus green color filter 81, only the blue and the red color bands will be transmitted. Hence, the galvanometer will be allowed to record only on film 23 and not on film 21. On the other hand, if only the neutral filter 72 is interposed in the path of the object beam 44, then the recorder will record on both films 21 and 23. Finally, if the valves are positioned such that the object beam 44 passes through the neutral filter 82 and through the minus blue color filter 71, only the green and red portions of the spectrum will be transmitted and the recorder will record only on film 21.

The transmission value of each neutral filter is chosen to be approximately the same as the maximum transmission value of the color filter with which it alternates. Hence when valve 70 periodically intercepts the object beam 44, trace 33 becomes correspondingly interrupted (coded) while at the same time, the intensity of trace 31 remains substantially uniform. Similarly with the alternations of valve 80, trace 31 is interrupted while the intensity of trace 33 remains substantially uniform.

Obviously, the electromechanical driving means 100 can be independently controlled so that the rate of interruption caused by one valve may be independent of the position of the other valve. One valve may be stationary and the other movable, or both valves may be stationary thereby allowing for the selective recording of traces 31, 33. In addition to becoming selectively recorded, each trace can be also independently coded. In sum, each galvanometer can selectively record on either film or simultaneously on both films with the same or with distinct codes. It will be therefore appreciated that the recorder of the present invention allows great flexibility of operation.

Although an exemplary embodiment of the invention has been illustrated, the invention is not limited thereto. Accordingly, the accompanying claims are intended to include all equivalent arrangements falling within the scope of the invention.

What is claimed is:

1. In a recorder having a galvanometer for reflecting at least one object-light beam including at least two distinct color bands, the combination comprising: means positioned in the path of the reflected beam for segregating said color bands into separate light channels, a distinct recording medium for each channel, first movable filter means absorbing one of said color bands, second movable filter means absorbing the other of said color bands, and means for selectively inserting said first and said second filter means in the path of said object beam thereby recording said reflected beam on either or both of said recording media.

2. In a recorder having a galvanometer for reflecting at least one object-light beam including at least two distinct color bands, the combination comprising: at least one dichroic mirror positioned in the path of the reflected beam for segregating said color bands into separate light channels, a movable recording film for each channel, first movable filter means substantially completely absorbing one of said color bands, second movable filter means substantially completely absorbing the other of said color bands, and electromechanical driving means for selectively inserting said first and said second filter means in the path of said object beam thereby enabling said galvanometer to record said reflected beam on either or both of said films.

3. In a recorder having a galvanometer for reflecting at least one object-light beam including at least two distinct color bands, the reflected beam being displaced as a function of a measured condition, the combination comprising: means positioned in the path of the reflected beam for segregating said color bands into separate light channels, a distinct movable recording film in each channel, each channel including a cylindrical lens for converging the light rays in the channel to a spot at the plane of the recording film; first movable filter means absorbing one of said color bands, second movable filter means absorbing the other of said color bands, means for selectively inserting said first and said second filter means in the path of said object beam thereby enabling said galvanometer to record on either or both of said recording films.

4. In a recorder having a galvanometer for reflecting at least one object-light beam including at least three distinct color bands, the reflected beam being displaced as a function of a measured condition, the combination comprising: means positioned in the path of the reflected beam for segregating said color bands into at least three light channels, a first movable recording film in the first channel, a second movable recording film in the second channel, a viewing scale in the third channel; first movable filter means absorbing one of said color bands, second movable filter means absorbing another of said color bands, means for selectively inserting said first and said second filter means in the path of said object beam thereby enabling said galvanometer to record on either or both of said recording films and to display the displacements of said object beam on said viewing scale.

5. The recorder defined in claim 4 and further including a cylindrical lens disposed near each film for converging the light rays to a spot at the plane of the film, a mercury vapor light source and an opaque plate defining an elongated slot illuminated by said source for providing said object-light beam.

6. The recorder as defined in claim 5 and further including a lens positioned in the path of said object beam for converging it unto said galvanometer.

References Cited in the file of this patent

UNITED STATES PATENTS

| | | |
|---|---|---|
| 2,366,194 | Kaiser | Jan. 2, 1945 |
| 2,379,233 | Hood | June 26, 1945 |
| 3,011,856 | Palmer | Dec. 5, 1961 |
| 3,035,179 | Parker | May 15, 1962 |
| 3,072,907 | Boucher | Jan. 8, 1963 |

OTHER REFERENCES

Gundelfinger et al.: A High Speed Colour Printer, Journal of Photographic Science, vol. 8, No. 5, Sept.-Oct. 1960, pp. 161–170.